United States Patent [19]

Schade et al.

[11] 4,079,151

[45] Mar. 14, 1978

[54] FROSTED COATING FOR SWEETENED FOODS

[75] Inventors: Hans R. Schade, Richland; Patricia A. Baggerly; David R. Woods, both of Battle Creek, all of Mich.

[73] Assignee: General Foods Corporation, White Plains, N.Y.

[21] Appl. No.: 582,047

[22] Filed: May 29, 1975

[51] Int. Cl.² .............................................. A23L 1/34
[52] U.S. Cl. .................................... 426/96; 426/103; 426/302; 426/548
[58] Field of Search .......................... 426/103, 96, 302

[56] References Cited

U.S. PATENT DOCUMENTS 3,395,213 7/1968 Reickmann .......................... 426/103

OTHER PUBLICATIONS

Searle Biochemics 9/27/74 "EQUA 200 TM (Aspartame) Sweetener as a Food Ingredient".

Primary Examiner—Norman Yudkoff
Attorney, Agent, or Firm—Michael J. Quillinan; Thomas V. Sullivan; Mitchell D. Bittman

[57] ABSTRACT

A comestible coating composition and method of application utilizes a high intensity sweetener such as the dipeptide APM applied to a cereal or like food surface by spraying discrete microcapsules of coating solution thereon and partially drying same incident to application, whereby the moieties of coating solution adhere to the comestible surface and successive particles accumulate to provide a foamy coating which dries to a uniform sweetness and frosted appearance.

31 Claims, 4 Drawing Figures

FROSTED COATING FOR SWEETENED FOODS

INTRODUCTION

This invention relates to processes for application of high intensity sweeteners, and particularly dipeptide sweeteners, to dry comestible products generally and typically ready-to-eat breakfast cereals.

BACKGROUND OF THE INVENTION

High intensity sweeteners such as the dipeptide sweetener L-aspartyl-L-phenylalanine methyl ester, i.e. APM, and similar lower alkyl esters of aspartyl-phenylalanine have been proposed as sweetening compounds to be applied to the surface of ready-to-eat breakfast cereals and like comestibles. Such a sweetener would serve as a substitute for sugars such as sucrose which are presently used as coatings on food products. There is a market for comestibles wherein there is a reduction or elimination in the level of surface-applied sugars. Lessening sucrose content is believed by some to reduce the incidence of dental caries. Generally speaking, there is a growing desire to lessen sucrose intake as a part of food products that are pre-sweetened. Yet, organoleptic acceptability dictates that some surface application of sweetness be afforded to satisfy desired consumer preference for pre-sweetened products, particularly cereals. High intensity sweeteners are low caloric and would appear a likely agent for such pre-sweetened products.

Such dipeptide sweeteners as the aforesaid methyl ester (APM) have a sweetening power 150–200 times that of sucrose and therefore must be applied as a uniform dispersion in order to dilute sweetness impact. Uneven application of such dipeptide sweeteners can result in the oral sensation of "hot spots" of high sweetness intensity which may linger.

In providing such coating applications, it is also desirable to provide a frosted, crystalline-appearing surface reminiscent of some popular sucrose-coated cereals. A dextrindipeptide sweetener coating does not normally exhibit a crystalline appearance when dried and more commonly dries as a glassy coating. An attempt to provide a pseudo-crystalline surface using high intensity sweeteners has presented a difficult technical challenge. Provision of whiteners such as titanium dioxide in the coating merely offers a whitish caste, but not the crystalline appearance reminiscent of frosted ready-to-eat breakfast cereals. Use of such whitening agents at significant levels adversely affects flavor.

Yet, application of dipeptides in solution with a suitable carrier such as a malto-dextrin offers distinctive organoleptic improvements in that the carrier affords a smoothening of the sweetness response and aids in dilution of the high intensity sweetener and uniformity of distribution thereof on the cereal or like comestible. Indeed, such a coating is believed to complement the cereal flavor notes and afford a pleasing taste with minimal lingering aftertaste as described in U.S. patent application Ser. No. 508,299 by Patricia Ann Baggerly filed Sept. 23, 1974 now U.S. Pat. No. 3,955,000, issued May 4, 1976 for CEREAL PROCESS AND PRODUCT. Although such high intensity sweetness dextrin coatings per se are capable of being dried in a manner which affords a white appearance and suggests a somewhat crystalline character in the coating, the methods necessarily employed call for a protracted or complicated coating procedure.

It is the object of this invention to provide a coating method which readily produces a pseudo-crystalline frosted appearance on comestibles as indicated above, the coating containing a high intensity sweetener such as the class of dipeptide sweeteners and like L-aspartic acid derivatives as the primary source of sweetening, although other high intensity sweeteners may be similarly coated including saccharine, calcium and sodium cyclamate, mixtures of saccharine and cyclamates and mixtures of L-aspartic acid derivatives with saccharine and/or cyclamates.

STATEMENT OF THE INVENTION

In accordance with this invention the objects are met by spraying a liquid coating of dextrin or like encapsulating solid and the high intensity sweetener in solution while causing the droplets thereof to undergo partial evaporation incident to the process of transfer from the spray source onto the cereal or other comestible base, which evaporation continues during a progression of successive applications of the spray droplets as discrete microcapsules. The moieties of coating solution thereby accumulate upon one another and result in the foamy coating which will eventually dry to provide a frosted appearance as well as a uniform sweetness application to a comestible base.

In effecting this transfer a spray of microcapsules is preferably, though not necessarily, applied to a preheated food base in a coating zone which is heated above normal ambient room temperature conditions whereby sufficient dehydration occurs incident to transfer from the spray source onto the base and during dehydration of the accumulating microcapsules forming the foam coating. A typical application employs a heated coating reel wherein the comestible is tumbled, successive quantities of droplets of the coating composition being thereby successively applied either in a batch or in a continuous manner. Indeed, tumbling is thought to be a preferred means for maximizing a pseudo-crystalline appearance; tumbling of the foam-coated particles abrades the drying surface of the foam, thereby increasing the irregular surface and scattering the reflected light. Tumbling, however, should be protracted beyond that point whereat the coating effect is lost.

The encapsulating colloid used to form the coating is typically a malto-dextrin or equivalent water-soluble polyhydric starch moiety which is compatable with the high intensity sweetener. As the solution solent undergoes evaporation incident to application to the surface of the foodstuff, there is an increase in the solids concentration of the microcapsules whereby remaining solids are caused to reside on the surface of the foodstuff and not migrate to the interior thereof. With successive accumulations of like drying droplets of coating solution, there is a build-up of the semi-dried particles whereby there is an irregular but continuous surface coating created which is nevertheless uniform in terms of the sweetness afforded. When the product is ultimately dried to say less than 6% moisture and remove excess moisture or other solvent from the surface thereof and yield the stable frosted appearance, this irregular uneven surface can be viewed microscopically and under stereo-microscopy will be seen to be underlied by a recticular foam formed by a plurality of bubbles in various states of collapse offering the gross pseudo-appearance of crystallinity. Desirably, the coated product has a sweetness profile similar to that of sucrose-sweetened frosted ready-to-eat cereal and like products that have been pre-sweetened.

The coating solution preferably includes a vegetable oil or like triglyceride which controls uptake of milk and moisture generally whereby the base product will retain sweetness and crispness and have a limitation on the imbibition of water either incident to consumption or to packaging. The presence of such a hydrophobic material within the coating is not essential however inasmuch as the foodstuff may be undercoated by such material and indeed it may be overcoated by any such material operative to control hydration and water absorption. Undercoating or overcoating may alter the appearance of a frost by resulting in a slight reduction of the pseudo-crystalline appearance; on the other hand, the most convenient means of application in accordance with this invention will involve emulsificaion of the vegetable oil or equivalent hydrophobic agent as part of the encapsulating solids employed with the high intensity sweetener.

In effecting distribution of the encapsulating agent in the solvent therefor with the high intensity sweetener, no criticality is observed, it being simply necessary that the encapsulating agent and the high intensity sweetener be well-blended and well-distributed in the solvent forming the coating solution. Since the preferred solvent is water or an aqueous medium wherein the high intensity sweetener is substantially dissolved, recognizing that some of the sweetener may be undissolved, any means for effective blending the solution ingredients may be employed. Thus, a high speed blending operation for a matter of minutes to evenly distribute ingredients throughout the coating solution will be employed whereafter at a lower speed the optional hydrophobic agent, i.e. the vegetable oil, may be blended and then emulsified at a higher speed to evenly incorporate air and added oil in the coating solution. Essentially, therefore, when hydrophobic materials such as triglycerides are employed as part of the coating solution, it will be desired to substantially emulsify the solution. In this connection, the malto-dextrin and equivalent encapsulating agents itself will have emulsifying properties which contribute to the uniformity of dispersion and indeed emulsifiers such as mono- and di-glycerides may be added as part of the coating solution to further promote emulsification and uniformity of distribution. A typical level of vegetable oil will be 10% by weight of the coating solution a broad range being 1%-15%, there being no practical upper limit other than the excessive oiliness or organoleptic effect provided by having an excess of oil on the surface of the base product.

The dipeptides preferably of use are high intensity sweeteners generically characterized as L-aspartic acid sweetening derivatives of which the dipeptide, L-aspartyl-L-phenylalanine methyl ester is most preferred. Examples of these compounds are set forth in U.S. Pat. Nos. 3,475,403 issued Oct. 28, 1969; 3,492,131 issued Jan. 27, 1960; 3,642,491 issued Feb. 15, 1972; and in the following published foreign patents, Union of South Africa patent application No. 69/5083 filed July 17, 1969; and British Pat. No. 1,042,488 published Sept. 14, 1966. Generically these compounds are represented by the formula:

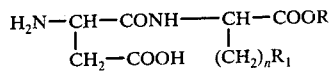

wherein R represents the lower alkyls, lower alkylaryls and cycloalkyls; $n$ stands for integers 0–5; $R_1$ represents (a) phenyl group, (b) lower alkyls, (c) cycloalkyls, (d)

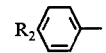

where $R_2$ is hydroxy, lower alkoxy, lower alkyl, halogen, (e) S(O)m where $n$ is 1 or 2 and provided $m$ is 0, 1 or 2, (f)

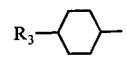

where $R_3$ represents an hydroxy or alkoxy and (g)

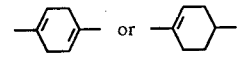

single or double unsaturated cycloalkyls with up to eight carbons.

Most suitable among these compounds are the lower alkyl esters of aspartyl phenylalanine (U.S. Pat. No. 3,492,131) wherein the stereochemical configuration is DL-L, L-DL, DL-DL, or L-L.

Other L-aspartic acid derivatives thought to be of use in accordance with this invention are:

(1) Those disclosed in E. R. Squibb & Sons Inc., W. German published application OS No. 2,054,545 for the methyl esters of L-aspartyl-2,5-dihydro-L-phenylalanine; L-aspartyl-L-(1-cyclohexene-1)-alanine; L-aspartyl-L-phenylglycine; L-aspartyl-L-2,5-dihydrophenylglycine;

(2) Methyl-L-aspartyl-L-alpha-phenylglycinate and its salts as disclosed in French Pat. No. 2,077,486 issued to Rhone-Poulenc;

(3) The lower alkyl esters of L-aspartyl-L-(Beta-cyclohexyl) alanine disclosed in South African Pat. No. 69/5910 issued to Imperial Chemical Industries Ltd.;

(4) Those alpha-(L or DL) asparagyl-(L or DL)-R-alanine alkyl esters described in Netherlands published Patent Application No. 7007176 of Stamicarbon, N.V.;

(5) Those hydrogenated dipeptide esters such as the L-aspartyl-O-etherified-L-serine methyl esters described in French Pat. No. 2,105,896 of Takeda Chemical Industries, Ltd.;

(6) L-aspartyl-L-1,4-dimethylpentylamide disclosed in W. German published Application OS No. 2,306,909 of The Procter and Gamble Co.

The foregoing list of L-aspartic acid derivatives are not intended to be all-inclusive or limiting since other like derivatives may be employed with similar utility in providing the novel frosted appearance.

Indeed the procedure of foaming in accordance with this invention will work on any high intensity sweetener and, therefore, the invention in its widest approaches may be used to apply the following listed sweeteners which sweetness levels matched to suit organoleptic preferences generally for sucrose-coated cereals and like comestibles: Several amino acids such as glycine, phenylalanine, and D-tryptophane; glycyrrhizin from licorice root, stevioside from a Paraguayan herb, and protein fractions isolated from Miracle fruit and Serendipity berries; saccharin, sweet polyols such as glycerol; cyclamate in the sodium or calcium salt and combinations of cyclamates with saccharin; dihydrochalcones.

The encapsulation carrier is ideally a starch hydrolyzate recovered by the acid or enzymatic hydrolysis of an amylaceous substance preferably having a low dextrose equivalency and providing oligosaccharides of elemental mono-saccharides and di-tri, tetra-, penta- and hexa-saccharides which may be varying dextrose equivalency but commonly would have a DE less than 30 and more preferably less than 20 and of the order of 10–20, such as reduces the hygroscopicity of the dextrin carrier coating solid; indeed a dextrin as low as 1 or 2 D.E. can be used. Advantageously such dextrinous materials even the taste impact generated by the sweetening agent and any inbalance attributable to imcomplete solution thereof or non-uniformity of its dispersion.

DETAILED DESCRIPTION OF THE INVENTION AND BEST MODE

Figure 1:
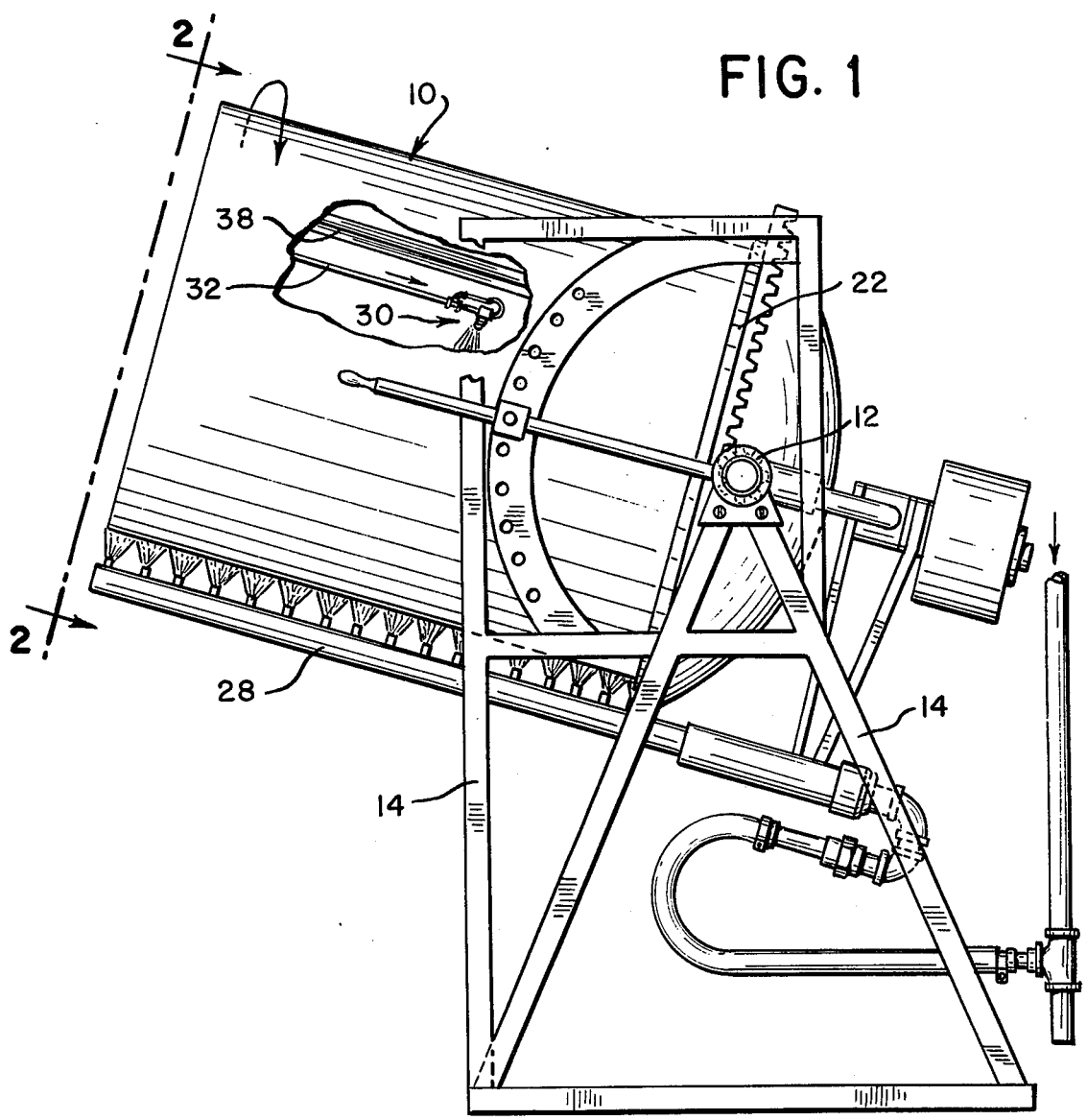
Figure 2:
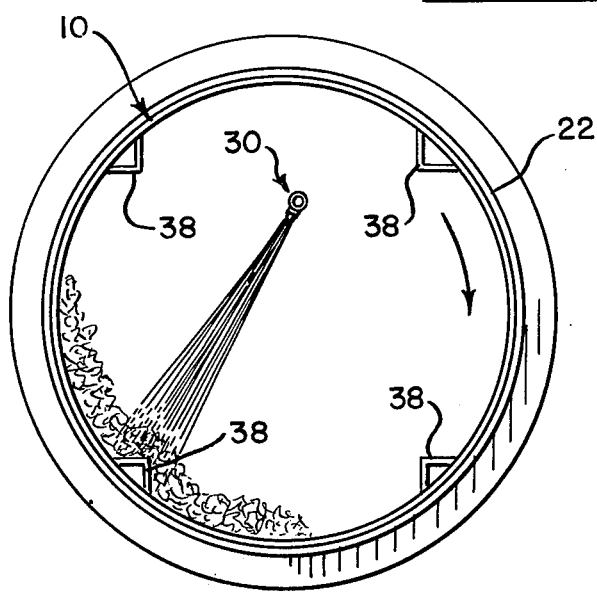
Figure 3:
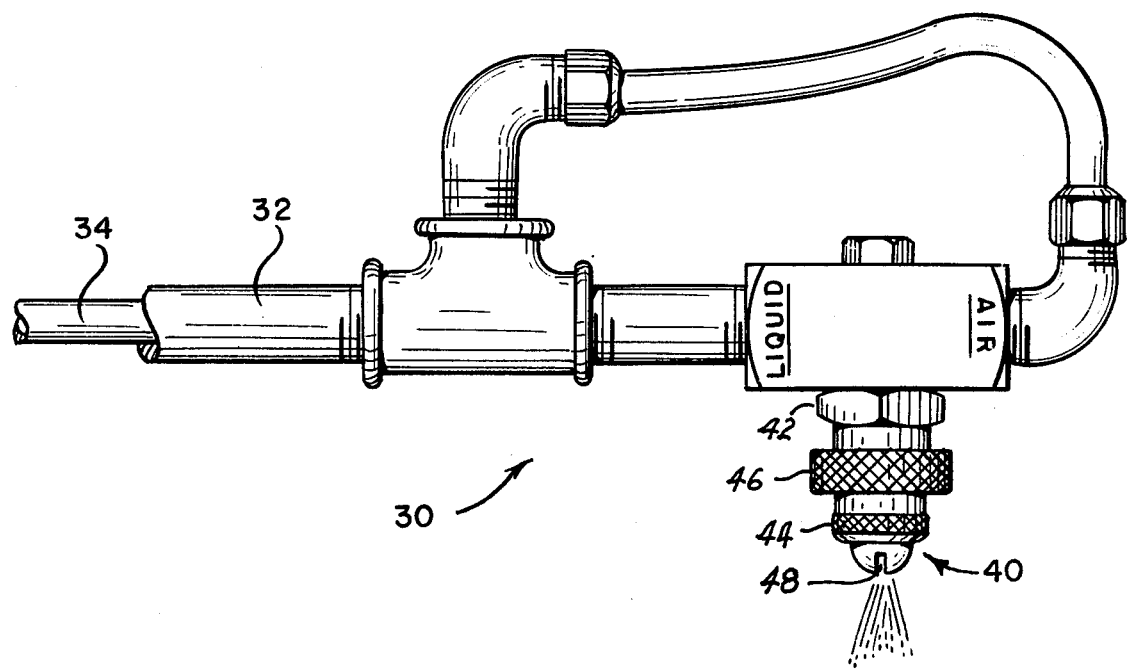
Figure 4:
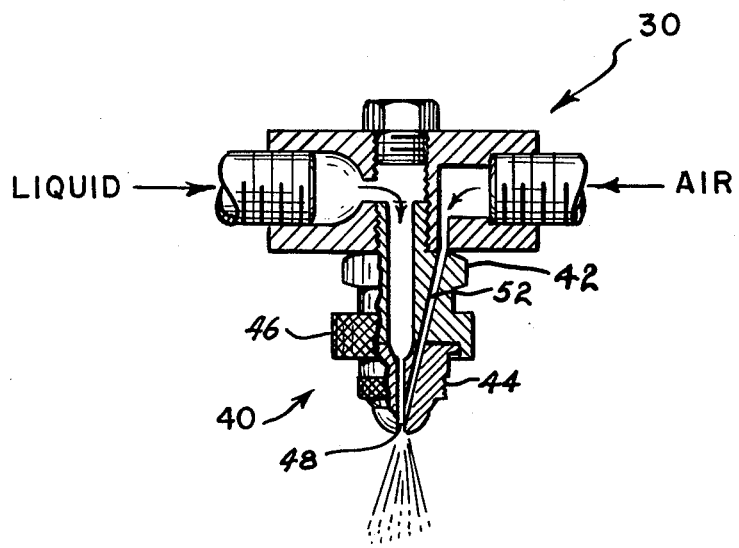

Referring now to the accompanying drawings wherein FIG. I is a side elevation of a typical coating reel;

FIG. II is an end view along line 2—2 in FIG. 1;

FIG. III is an expanded view of the nozzle arrangement shown in FIGS. I and II for spraying coating solution; and FIG. IV is a view partly in section and partly in elevation of the nozzle shown in FIG. III, the coating reel of use in this invention is seen to comprise a cylindrical 25 inch diameter drum 10 mounted for rotation at one end about a horizontal axis through trunion bearings 12 mounted on supporting frame 14.

The drum is adapted to be tilted by handle means (not shown) and be rotated about its longitudinal axis by gear means (also not shown) which engage the teeth of annular collar 22 on drum 10 to drive it at 19 r.p.m. The drum 10 is adapted to be flame-heated by means of gas jets emanating from gas manifold 28 communicating with a gas source as shown by employing the flame heat, the product will be elevated during spray coating and tumbling to a temperature of about 170° F, a broad product temperature range being 150° –200° F.

The coating solution is applied by means of the nozzle generally indicated by reference character 30 mounted on feed system 32, said system comprising an inner tube 34 for delivering liquid coating solution within tube 35 wherein atomizing air under 60 psig pressure is supplied to the nozzle; the range of nozzle pressure may be between 50 and 80 psig. The coating reel is driven clockwise as seen in FIG. II and is adapted to tumble the charge of breakfast cereal puffs to be coated, said puffs being elevated under control of baffles 38 upwardly and tumbling downwardly into the path of a flat spray having the general outline shown in FIGS. I and II and thus contacting the puffs as shown. Thus, as product is elevated by the baffles it commences forming a bed of charge which then tumbles downwardly into the path of discrete microcapsule moieties of coating solution. With continued rotation the foam which develops and accumulates on the puffs creates the structure desired.

A coating solution is prepared containing 55.6% maltodextrin (Frodex 15 D.E.), 0.4% spray dried flavor, 10.0% vegetable oil, 0.7% APM dipeptide and 33.3% water. After dry blending the dextrin, flavor and APM, water is added and blended well at a low speed with a Hobart whip. This is followed by a high speed blend for two minutes to evenly distribute ingredients. Whip speed is reduced and the vegetable oil is added. The composition containing the vegetable oil is blended at high speed for an additional minute to evenly emulsify the oil and generate moderate overrun.

In the batch coating apparatus shown, approximately five pounds of conventional gun-puffed ready-to-eat breakfast cereal dough particles that have been preheated to about 175° F broadly 150° –225° F, are inserted into the coating reel and three pounds of the coating solution are sprayed thereon over a period of 12–15 minutes. With continued constant rotation the foam structure is developed on the surface on the surface of the puffs.

To effect the intended spray pattern as shown in FIGS. I and II a flat spray atomizing assembly generally shown as 40 in FIG. IV is employed; e.g. Spray Systems Air Atomizing Nozzle Assembly shown in Catalog 44 of the Spray Systems Company, Illinois, United States, copyright 1973, using aircap number 125340 and fluid cap 40100. To better and fully understand this spray system reference may be had to FIG. IV wherein the assembly is seen to comprise fluid cap 42, knurled air cap 44 and knurled retaining ring 46. The air cap 44 has a flat spray orifice therein formed by slit 48. Air admitted as shown to manifold 50 passes through each of three ports 52 in air cap 44 and is admixed within the air cap with the coating solution. Coating solution enters manifold 51 as shown, passes through fluid cap 42 and enters aircap 44 wherein it is admixed with the air and caused to form the spray pattern. Incident to foam-coating development and tumbling the coated puff is partially dried to 6.5% moisture.

After development of the foam structure, the coated product is then further dried at 170° F drying air temperature for 15 minutes to remove additional moisture from the product to a final moisture content of 1.5%, broadly 1%–6%, preferably 4.5%. The finished dipeptide sweetened product yields a frosted appearance and a sweetness profile similar to sucrose-sweetened frosted ready-to-eat cereals.

While the invention has been described by reference to a specific operative best mode, it will occur to those skilled in the art that other means may be employed to effect a similar type of coating. Accordingly, a broad range of equivalent coating solutions, coating apparatus and conditions for effecting a coating are to be employed within the spirit of the invention which should be interpreted in accordance with the accompanying claims.

From the foregoing description of the best mode of operation, it will be noted that a number of variations in practicing the invention can be employed. Microcapsules produced by the high pressure spray system and deposited on the cereal puff as discrete moieties are caused to be more-or-less localized in place of the surface with minimum migration, if any, to the interior of the comestible. To effect this functionality, persons skilled in the art will understand that the concentration of the solvent for the coating solution will be a factor; it is estimated that in those coating solutions which are predominantly composed of dextrin that an aqueous solvent will be significantly evaporated incident to transfer from the point of origin of the droplets to the point of their application. Other solvents than water may be employed such as alcohols and the like. A practical upper limit for solvent temperature will be about 200° F; temperatures above 200° F are believed to involve a risk of degradation and loss of functionality and development of undesired by-product, i.e. the temperature of the L-asparatic acid derivative itself.

Size of the spray coating droplet will play some part in ability to effectively evaporate the solvent for the coating solution. With finer microcapsules the opportunity for maximal evaporation will be afforded and, hence, applicants' preferably employ a high pressure spray system. For lower pressures than those specified in the best mode, a relatively coarser particle will be created incident to which the opportunity for evaporation of the carrier solvent, i.e., water, will be lessened and resulting product will yield a more glazed appearance. However, still lower pressures than those can be advantageously employed when a white glazed effect is desired.

Likewise, temperature of the medium in which the spray coating is applied to the base charge will play a part. For this purpose it is desired that the cereal base or like comestible product will be pre-heated, thereby creating a continuing zone in the coating operation whereat evaporation and localization of the droplets onto the comestible surface is assured.

With increasing concentration of solids, there is an increase in viscosity and thixotrophic character as well as adhesive properties of the coating solids. Generally, the most preferred and practical way of assuring this condition of high spray-ability and yet sufficent adhesion of the particles produced will be to heat the zone of application, that is, the coating reel or its equivalent, to a temperature above 150° F and commonly above 175° F measured by a thermo-couple wire inserted into the empty zone of application at the intended point of interception of the spray pattern. Little advantage is to be gained by elevating the zone of application temperature much above 250° F whereat carmelization and off-flavors as well as possible degradation of the sweetener will be encountered.

Sweetness profile as well as the frosted appearance of the product will be influenced by the character of the comestible which is coated. Generally, advantageous use of the invention will accrue in the ready-to-eat breakfast cereal products such as puffs like gun-puffed, extrusion-puffed and vacuum-puffed goods and cereal flakes which are toasted to achieve distinctive and traditional textures and appearances. All of these goods may be similarly coated by the coating solution. The frosted coating results as indicated are an irregular surface stemming from accumulation of a plurality of the moieties of coating droplets as they adhere to the surface and build upon one another. Under a microscope this surface appearance will be readily apparent. Refraction of light as well as its reflection from the coated surface will impart the appearance of a frost, akin to the crystallization of sucrose.

The invention is not to be interpreted in terms of any particular theory or discussion of its principles of operation. However, certain experimental observations of the rather unexpected nature of the coating principle are useful in affording understanding of the structure that is produced upon application of the coating solution moieties and their stabilization on the coated comestible. Upon production of discrete moieties of coating solution by a high pressure spray medium, microcapsules of coating solution droplets are formed. These droplets encapsulate air or the other gas that may be employed to effect their formation in the internal mixing nozzle. Surface tension of the coating solution that undergoes spraying is such as to assure that bubble structure is maintained in this discrete form. In any such spray application some bubbles will collapse even prior to contact with the material undergoing coating. Indeed, bubble collapse is an important aspect of producing the resultant "foam" structure on the surface of the coated comestible. A dipeptide sweetener itself has certain film-forming properties which coupled with those of the malto-dextrins and in the presence of the longer chain triglycerides optionally present contribute to the foam-forming properties.

As the bubbles undergo transfer from their point of origin to the surface of the comestible, their initial viscosity, which may be in the order of 1250 cps, will undergo an increase estimated to be in the neighborhood of 5% – 20%, say 1300 cps. The microcapsules will undergo, a dehydration such that the moieties of coating solution contacting the comestible, will have sufficient viscosity to assure the surface strength necessary to have a foam formed in situ on the surface of the product as succeeding droplets coat the comestible.

The microcapsules contacting the foodstuff initially will accumulate thereon in the form of discrete mounds which will continue to build up and with tumbling and continued spray coating to provide the basis for pseudo-crystalline appearance of the invention. In this connection, it is desired not to have a light reticular delicate foam, since in doing so the coating solution may collapse resulting in a glassy, less frosty appearance. Furthermore, a light, delicate foam may be too fragile and may be abraded incident to handling of the dry comestible in packaging or otherwise. The foam that is produced in place on the coating should be sufficiently strong and possessed of such film-forming properties that it will retain or encapsulate in part the gases that are occluded within the spheres as well as those gases that are present in the spray environment.

Under microscopic examination, the structure that results from drying such a foam coating will appear quite irregular and yet will be translucent depending upon the character of the encapsulating colloid. Under a microscope it will be possible to observe the base puff or other comestible that is coated. There will be some reflectance of light. The consequence of the surface irregularity that is created by the plurality of applications of the moieties of coating solution as the bubbles contact the puff, some of their number will collapse and contribute to an irregular film formation with underlying bubbles providing support for encapsulating the gas and maintaining the foam stable. White light contacting the foregoing structure after dehydration will be refracted thereby and will in turn be transmitted to the eye of the observer with a randomness that simulates the optical effect of a crystalline sucrose coating.

It has been found that the same composition applied from a high pressure coating zone of atomization will produce a glassy non-crystalline appearance if the foam is caused to collapse. If the spray application zone is located too proximate the point of contact, the opportunity for discrete bubbles to partially dry and accumulate is reduced so that the coating formed is not of a foam structure but rather of a more-or-less continuous film which reflects light and through which the color of the base comestible, e.g., a base puff, can be grossly observed. Thus, the point of atomization initially should be sufficiently removed from the comestible undergoing coating to allow the microcapsules to accumulate and form the foam structure described herein, whereby light is transmitted to the eye of the observer by refractance as well as reflectance.

Maximal frosted appearance occurs when malto-dextrins having a dextrose equivalency generally less than 30 D.E., preferably less than 20 D.E., is afforded and in practicing this invention malto-dextrins having a D.E. as low as 1 or 2 may be employed. It appears that fat offers a benefit to the foam structure when it is part of the coating solution by imparting a more frosted appearance than when fat is absent from the coating solution and is separately applied as an undercoat or an overcoat. It should be understood in this connection that when a triglyceride is omitted completely from the coating solution, the same kind of frosted appearance is provided as when it is present. Presence of fat assures a better sweetness profile when it is part of the coating than when it is in the undercoat or the overcoat.

In practicing the preferred emobidiments of the invention, other additives or fortifying materials may be included in the coating solution such as vitamins, minerals and/or protein supplements all of which adjuncts will beneficially be located in the coating. Thus, any whipping or foaming agent such as egg albumin can be employed at less than 3% by weight of the coating solids in solution, say in the neighborhood of about ¼%, and aids in the formation of a foam structure of the intended stability.

Whereas the invention has been described in the preferred best mode as involving a semi-spray drying of coating solutions incident to application to the puff and involving the use of elevated ambient temperatures surrounding the comestible undergoing coating, it is within the spirit of this invention that by employment of foam fortifying agents such as the aforementioned egg albumin, the extent of semi-drying can be reduced and one may practice a multi-zone coating application in the first of which the microcapsules are applied and tumbled and in the second later succeeding zones of which the foam will be dried with the resultant structure or its equivalent that has been described in connection with the best mode.

Further, although the class of L-aspartic acid derivatives is that of the most sweetener compound of use, it is not intended to foreclose use of other sweetener is whole or partial substitution therefor. Thus, saccharin and/or cyclamates can be employed in lieu of or in combination with any of the dipeptides at a sweetness level at which they are compatible. Indeed, such "artificial" sweeteners appear to be quite synergetic in combination with APM, allowing comparable sweetness at reduced levels of APM. In general, in the finished food the total sweetener solids will be a very minor weight percent of the coating solids and generally range from 0.1% – 1.5% by weight thereof, the range being dependent upon organoleptic considerations and not being critical.

What is claimed is:

1. Process for applying a high intensity sweetener to a comestible which comprises forming a carrier solution of said sweetener and an encapsulating colloid, spraying said solution onto said comestible while causing a portion of the solvent therefor to evaporate so that the sweetener and the carrier therefor are deposited as discrete moieties on the surface of the comestible, continuing said coating operation to cause said moieties to merge with one another to form a coating of said comestible with said sweetener and said carrier therefor, and accumulating successive quantities of said moieties of said sweetener and carrier therefor on the surface of the comestible to form a foam, and thereafter removing excess solvent from the coated comestible to produce a frosted appearance.

2. The process of claim 1 wherein said solution employs an aqueous solvent for the sweetener and the encapsulating colloid, and the encapsulating colloid is a dextrin.

3. The process of claim 2 wherein the comestible is tumbled incident to said coating operation.

4. The process of claim 3 wherein said comestible is warmed above ambient room temperature prior to being contacted by the coating solution.

5. The process of claim 4 wherein the solution is sprayed at a high pressure which creates discrete particles.

6. The process of claim 5 wherein the dextrin in solution has a DE less than 30.

7. The process of claim 6 wherein the dextrin in solution has a DE less than 20.

8. The process of claim 1 wherein the coating solution contains a hydrophobic material.

9. The process of claim 8 wherein the hydrophobic material is a vegetable oil.

10. The process of claim 1 wherein the high intensity sweetener is an L-aspartic acid derivative.

11. The process of claim 10 wherein the L-aspartic acid derivative is a lower alkyl ester of aspartyl phenylanine.

12. The process of claim 11 wherein said lower alkyl ester is a methyl ester.

13. The process of claim 12 wherein said methyl ester is that of L-aspartyl-L-phenylalanine.

14. The process of claim 1 wherein the encapsulating colloid is a dextrin and the solution contains as a major percent of the carrier solids a dextrinous composition.

15. The process of claim 14 wherein said dextrinous composition is present as a major weight percent of the coating solution.

16. The process of claim 1 wherein the comestible is a ready-to-eat breakfast cereal.

17. The process of claim 16 wherein the coating solution contains a vegetable oil as a minor weight percent of the carrier solids.

18. The process of claim 1 wherein the coating solution employs less than 50% by weight water.

19. The process of claim 18 wherein a portion of the aqueous solvent is evaporated during transfer from the point of origin of the spray pattern to the point of contact with the comestible surface.

20. A coated comestible having a pseudo-crystalline surface appearance comprising a dried food base and a reticular coating, said coating being composed principally of an irregular continuous aggregation of microcapsules of encapsulating colloid and a high intensity sweetener composition accumulated upon one another, said capsules transmitting light and refracting it to provide a frosted appearance to the unaided eye.

21. The comestible of claim 20 wherein the comestible coating has a hydrophobic material therein.

22. The comestible of claim 20 wherein the encapsulating colloid is a dextrinous solid, and the dextrinous solids have a D.E. less than 30.

23. The comestible of claim 22 wherein the dextrinous solids have a D.E. less than 20.

24. The comestible of claim 23 wherein the dextrinous solids have a D.E. greater than 10.

25. The comestible of claim 21 wherein the coating contains a tri-glyceride.

26. The comestible of claim 25 wherein the triglyceride is at least 1% of the micro-capsule solids.

27. The comestible of claim 20 wherein the sweetener is an L-aspartic acid derivative.

28. The composition of claim 27 wherein the sweetener is a di-peptide.

29. The composition of claim 28 wherein the dipeptide is an alkyl ester of L-aspartyl-L-phenylalanine.

30. The composition of claim 29 wherein the ester is a methyl ester.

31. The process of claim 2 wherein the amount of said sweetener is within the range of about 0.1% to 1.5% by weight of the coated comestible.

* * * * *